United States Patent [19]

Peterson

[11] 4,337,708

[45] Jul. 6, 1982

[54] RAILWAY CAR SUPERSTRUCTURE FRAME

[75] Inventor: William H. Peterson, Homewood, Ill.

[73] Assignee: Pullman Incorporated, Chicago, Ill.

[21] Appl. No.: 139,514

[22] Filed: Apr. 11, 1980

[51] Int. Cl.³ ............... B23K 31/00; B23P 15/00; B61D 17/08

[52] U.S. Cl. .................. 105/397; 29/155 R; 52/666; 105/399; 105/401; 228/182; 403/346

[58] Field of Search ............... 29/155 R; 52/664, 666; 105/397, 398, 394, 400, 401, 409; 403/271, 346; 228/182

[56] References Cited

U.S. PATENT DOCUMENTS

| | | | |
|---|---|---|---|
| 1,305,746 | 6/1919 | Rush | 403/346 |
| 1,789,280 | 1/1931 | Armstrong | 403/346 |
| 2,216,025 | 9/1940 | Sheppard | 105/399 |
| 2,578,671 | 12/1951 | Chausson | 105/397 |
| 2,591,346 | 4/1952 | Fitzgerald | 403/346 |
| 2,646,008 | 7/1953 | Eksergian et al. | 105/401 |
| 2,657,645 | 11/1953 | Ecoff | 105/401 |
| 2,709,973 | 6/1955 | Meyer | 105/409 |
| 3,161,152 | 12/1964 | Johansson et al. | 105/409 |
| 3,319,585 | 5/1967 | Pulcrano | 105/409 |

FOREIGN PATENT DOCUMENTS

| | | | |
|---|---|---|---|
| 419083 | 3/1947 | Italy | 52/664 |
| 655526 | 7/1951 | United Kingdom | 403/346 |

Primary Examiner—Joseph F. Peters, Jr.
Assistant Examiner—Howard Beltran
Attorney, Agent, or Firm—Richard J. Myers

[57] ABSTRACT

A welded structural frame for a railway car wall is disclosed as including a pair of aligned U-section vertical members welded to opposite sides of a U-section longitudinal member and a reinforcing insert welded between the sides of the longitudinal member in alignment with the vertical members to provide a frame substantially free of welding distortion. A method of making such a frame is also disclosed as including securing longitudinal and vertical members in a fixture, welding the vertical members to opposite sides of the longitudinal member and then welding a reinforcing insert between the sides of the longitudinal member in alignment with the vertical members.

11 Claims, 8 Drawing Figures

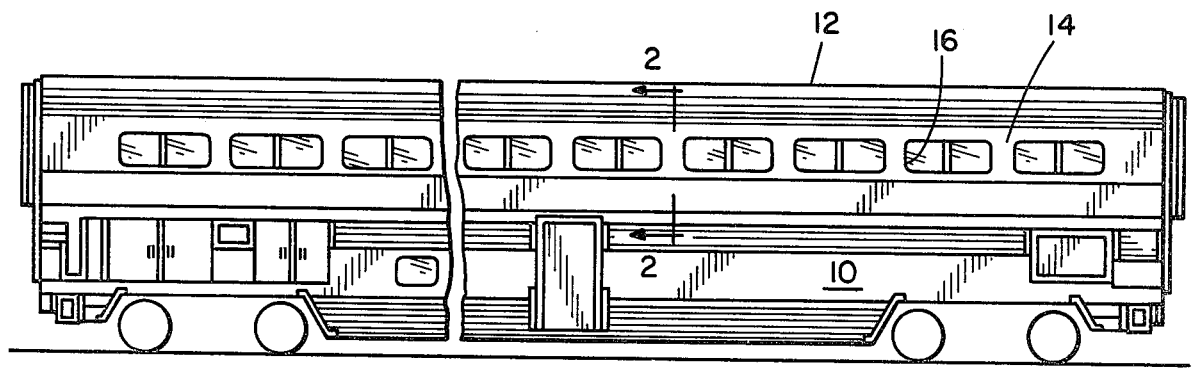
FIG. 1
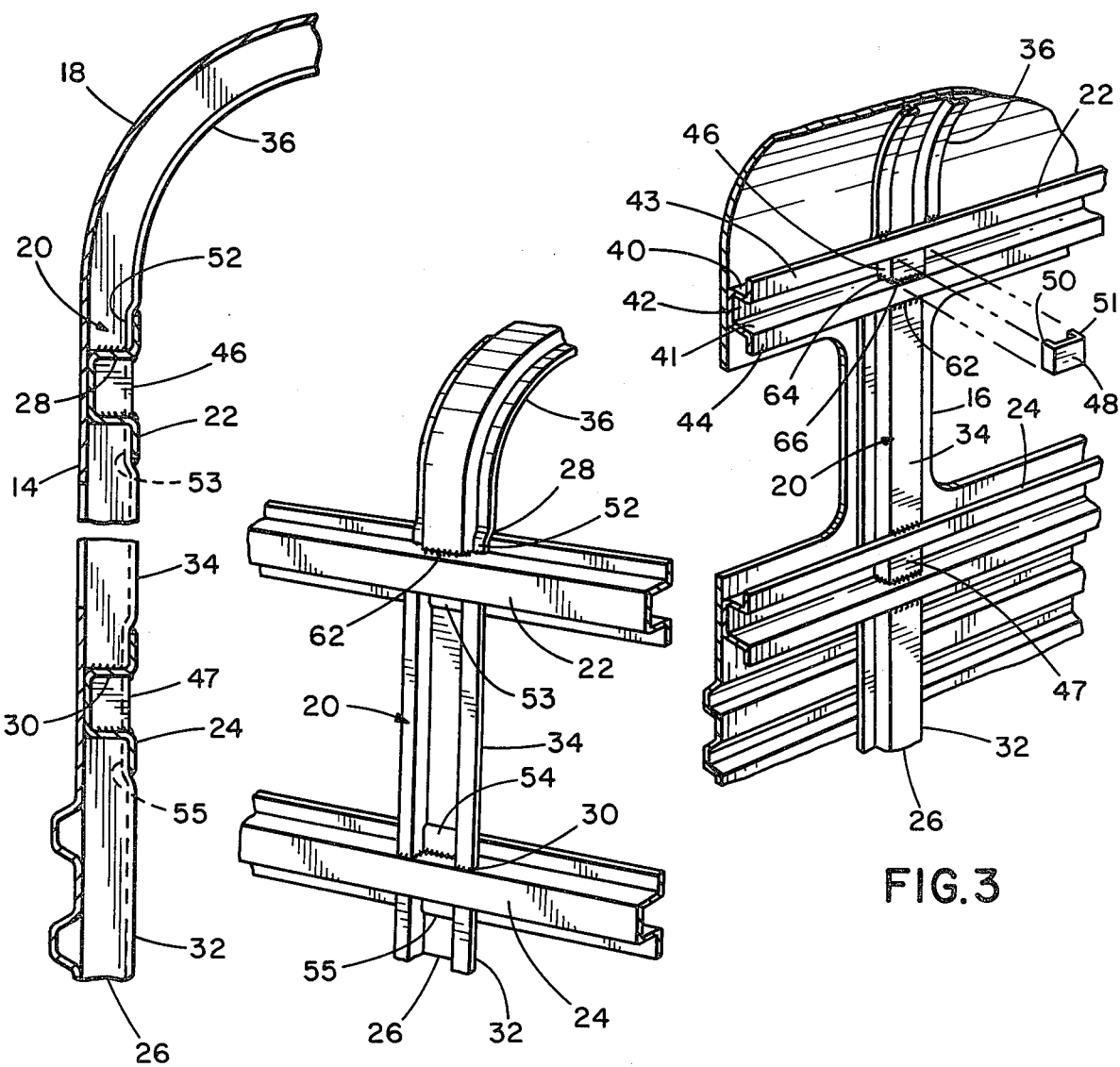

RAILWAY CAR SUPERSTRUCTURE FRAME

BACKGROUND OF THE INVENTION

1. Field of the Invention

This invention relates to welded structural frames for railway car walls.

2. Description of the Prior Art

Railway car sides are commonly supported by structural subframes formed from a number of horizontal and vertical members connected at their points of intersection by welded joints, as for example in U.S. Pat. No. 2,578,671. In a known frame of this type, which is constructed from structural steel members that are welded together while held in a jig, the joints are so distorted by the welding process that it is necessary after welding to straighten the frame manually. The straightening process add to the cost of production, and introduces unwanted stresses into the frame as well.

SUMMARY OF THE INVENTION

The invention is summarized as a low distortion welded structural frame for a railway car wall including a longitudinal U-section member having a pair of horizontal sides and having a vertical base interconnecting the horizontal sides, a pair of aligned vertical members, one abutting each of the sides of the longitudinal member and being welded thereto, and a reinforcing member welded between the sides in alignment with the vertical members.

An object of the invention is to construct a simple yet strong structural frame for a railway car wall.

Another object is to weld a structural frame in such a manner that subsequent straightening of the frame is not required.

BRIEF DESCRIPTION OF THE DRAWINGS

FIG. 1 is a side elevation of a railway car embodying the present invention.

FIG. 2 is a partial sectional view taken along the lines 2—2 in FIG. 1.

FIG. 3 is a perspective view of FIG. 2 taken from the right side thereof.

FIG. 4 is a perspective view of FIG. 2, with parts removed, taken from the right side thereof.

DESCRIPTION OF THE PREFERRED EMBODIMENTS

Figure 5:
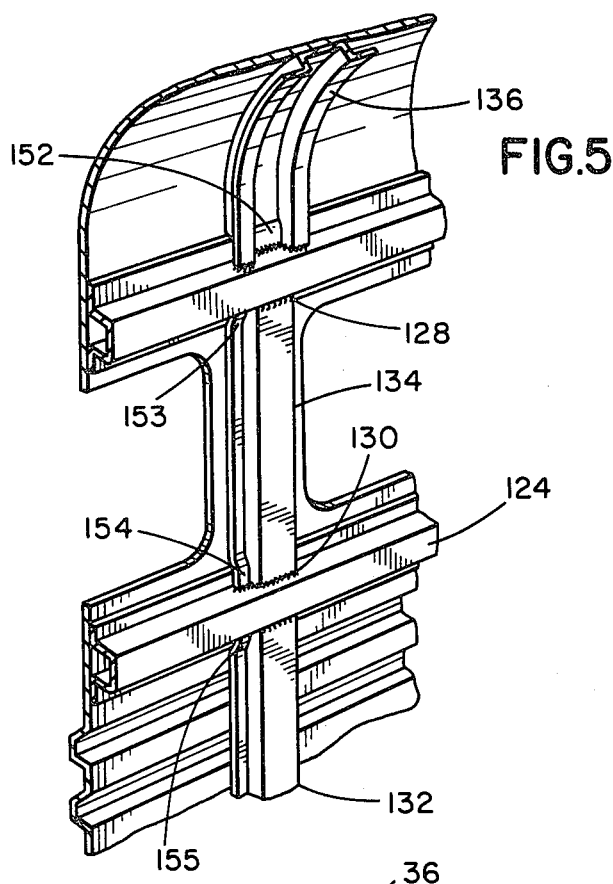
FIG. 5 is a perspective view similar to FIG. 3 but showing a first modification thereof.

Referring to FIG. 1, the invention is embodied in a railway car 10 having a top 12 and a side wall 14 with a number of window openings 16 therein. As shown in FIG. 2, where structure not pertinent to the invention has been omitted, the side wall 14 includes an outer sheath 18 supported by a steel frame designated generally as 20. The frame 20 includes parallel, continuous longitudinal members 22 and 24 which are interconnected at intervals by wall post pillars 26 that are welded to the longitudinal members 22 and 24 at upper and lower joints 28 and 30. FIGS. 2, 3 and 4 show a representative portion of the frame 20 including one pillar 26. Each pillar 26 includes a lower segment 32, an intermediate segment 34, and an upper segment 36 which are aligned so as to abut the sides of the longitudinal members 22 and 24 opposite one another.

Each of the longitudinal frame members 22 and 24 has a generally U-shaped cross section as shown in FIG. 3, including a pair of horizontal sides 40 and 41 interconnected by a base 42 that lies in a vertical plane. The sides 40 and 41 have external flanges 43 and 44 respectively along their distal edges remote from the base 42.

The vertical members 32, 34 and 36 each have a flanged U-section similar to the longitudinal members 22 and 24. The lower and intermediate members 32 and 34 which have their flanges facing the outer sheath 18, effectively form box channels having high structural strength when welded to the outer sheath 18.

The upper joint 28 is reinforced by an insert 46 (FIG. 3) welded between the sides 40 and 41 of the longitudinal member 22. The insert 46 has a base 48 with two parallel arms 50 and 51 extending from opposite edges thereof and is oriented transverse to and facing the longitudinal member 22, so that each arm 50 and 51 extends toward the base 42 of the member 22. The lower joint 30 includes an insert 47 similar to the insert 46. The inserts 46 and 47 enable one to produce undistorted joints 28 and 30 as described hereafter, and reinforce the pillars 25 against bending as well.

As shown in FIGS. 2 and 4, offsets 52 are formed in the flanges of the upper vertical member 36 where it meets the longitudinal member 22 in order to avoid interference with the upper flange 43 of the member 22, thereby providing a flush joint 28 that facilitates subsequent attachment of sheet material to the frame 20. An offset 53 is formed in the base of the intermediate vertical member 34 to clear the lower flange 44 of the longitudinal member 22. Similar offsets 54 and 55 are formed at the lower joint 30 to accommodate the flanges of the member 24. In addition to creating flush joints, the offsets 52–55 provide overlapped portions which when welded have high strength.

Figure 6:
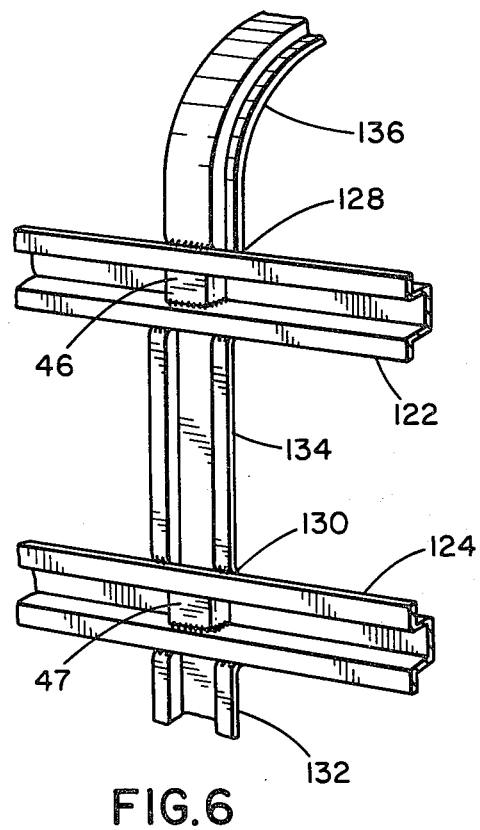
FIG. 6 is a perspective view of FIG. 5 taken from the left side thereof.

A first modification of the invention is shown in FIGS. 5 and 6, wherein parts identical to those in FIGS. 2 to 4 are indicated by identical reference numerals and corresponding parts are designated by corresponding numerals with 100 added. The orientation of the longitudinal members 122 and 124 is reversed with respect to the first embodiment, so that the bases 142 of the members 122 and 124 are nearer the inside of the car; however, the orientation of the vertical members 132, 134 and 136 is unchanged from FIGS. 2-4. Reinforcing inserts 46 and 47, and offsets 152–155 are included in the joints 128 and 130 substantially as described above.

Figure 7:
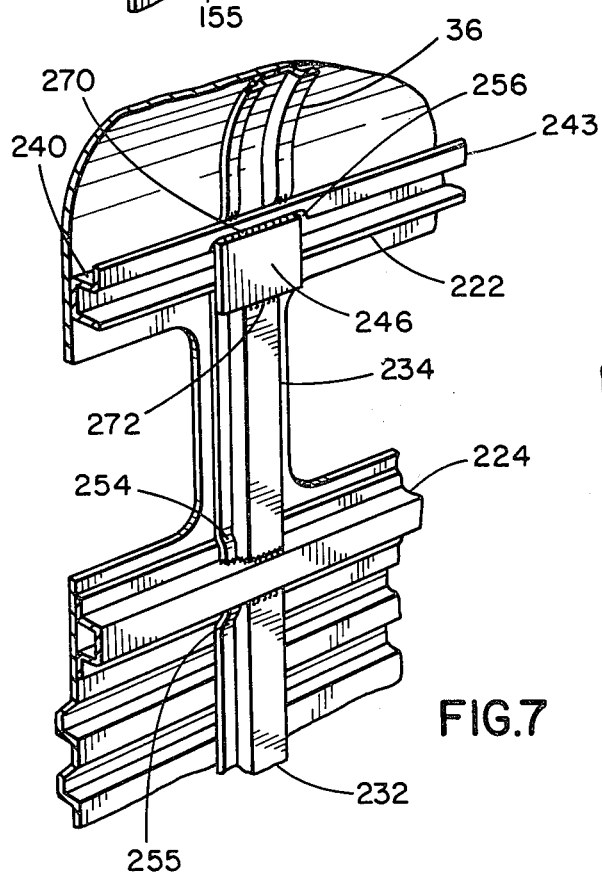
FIG. 7 is a perspective view similar to FIG. 3 but showing a second modification thereof.
Figure 8:
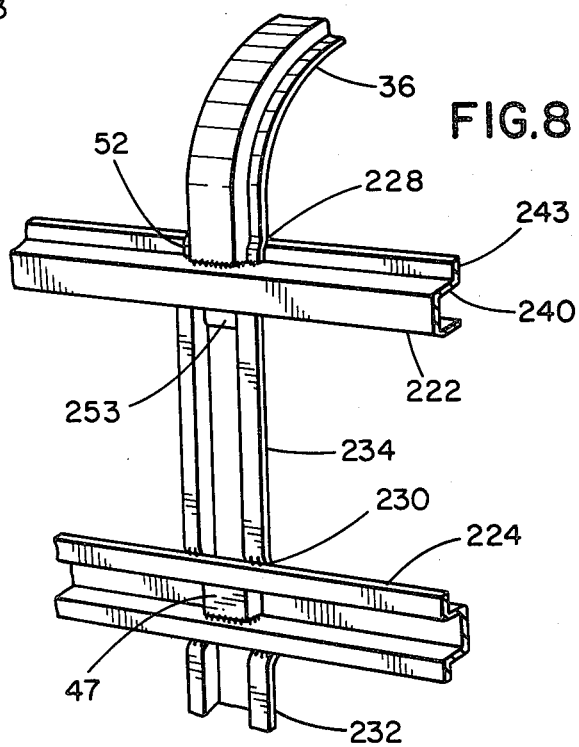
FIG. 8 is a perspective view of FIG. 7 taken from the left side thereof.

A second modification is shown in FIGS. 7 and 8, wherein parts identical to those in FIGS. 2 to 4 are indicated by identical reference numerals and corresponding parts are designated by corresponding numerals with 200 added. The longitudinal members 222 and 224 are oriented in opposite directions and are attached to vertical members 232, 234 and 36 at joints 228 and 230. The upper longitudinal member 222 has only one flange 243, which extends from the upper side 240. The reinforcing member at the upper joint 228 is a flat plate 246, rather than an insert 46 (FIG. 2). The plate 245 is welded to the flange 243, offsets 52, 253, 254 and 255 being formed in the vertical members. An additional offset 256 formed in the flange 243 of the member 222 allows the plate 246 to lie flush with the joint 228. The lower joint 230 is reinforced by an insert 47 as in the first two embodiments.

A preferred method of constructing the frame 20 shown in FIGS. 2 to 4 includes a first step of securing parallel longitudinal members 22 and 24 within a fixture (not shown). Aligned vertical pillar segments 32, 34 and 36, which have previously been provided with offsets 52, 53, 54 and 55 to clear the flanges 43 and 44 of the longitudinal members 22 and 24, are then clamped in the fixture so as to abut the sides 40 and 41 of the longitudinal members 22 and 24, thereby defining joints 28 and 20. A flat plate (not shown) is included in the fixture to align the components to provide flush joints. Since a complete frame 20 includes a number of similarly constructed joints 28 and 30, the construction of only one upper joint 28 is described hereafter.

With components thus secured in the fixture, each pillar segment 34 and 36 is joined to the longitudinal member 22, each by a continuous weld 62. Subsequently, with the frame 20 still in the fixture, an insert 46 is placed between the sides 40 and 41 of the longitudinal member 22 in alignment with the pillar segments 34 and 36, so that the arms 50 and 51 of the insert 46 extend transversely between the sides 40 and 41 of the longitudinal member 22 towards the base 42 thereof. After the insert 46 is tacked in position, each arm 50 or 51 of the insert 46 is welded to each side 40 and 41 of the longitudinal member 22, but not to the base 42. Lastly, the base 48 of the insert 46 is welded to the sides 40 and 41 of the member 22.

Despite the commonly known and expected phenomenon of joint distortion caused by thermal shrinking of weld material within a joint as the weld cools, joints constructed according to the invention are found to have little or no net distortion, so that the frame can be used as it comes from welding, without the need for an added straightening step. The reason for the lack of joint distortion has not been precisely analyzed; however, it seems probable that the various welds have countervailing effects which offset one another to produce negligible net distortion.

It has been discovered that the order in which the welds are placed in the joints is critical to minimize distortion. First the pillar segments 34 and 36 are joined to the member 22, then the arms 50 and 51 of the insert 46 are joined to the member 22, and lastly the base 48 of the insert 46 is welded to the member 22. Any variation from this sequence has been found to produce substantially greater distortion.

The frame shown in FIGS. 5 and 6, which has members 122 and 124 reversed in orientation from members 22 and 24 in FIGS. 2 to 4, is otherwise constructed substantially as described in the preceding paragraphs.

The embodiment of FIGS. 7 and 8 is constructed as described above, except that after the pillar segments 234 and 36 have been joined to the member 222, a plate 246 is placed over the joint 228 with the upper edge of the plate 246 in an offset 256 specially formed to receive the plate 246 to provide a flush joint. Thereafter, the plate 246 is joined to the upper flange 243 by a first weld 270, and then the lower edge of the plate 246 is attached by a weld 272 to the intermediate pillar segment 234.

An advantage of the invention is that the frame can be welded from one side only, avoiding the need to move around the fixture or turn the frame during the welding procedure.

Inasmuch as the invention is subject to many modifications, variations and changes in detail, it is intended that all matter contained in the foregoing description or shown in the accompanying drawings shall be interpreted as illustrative and not in a limiting sense.

What is claimed is:

1. A welded structural frame for a railway car wall which displays low distortion during and after assembly comprising:
a longitudinal U-section member forming part of a side wall frame and having a pair of opposed, horizontal sides and having a vertical base interconnecting said horizontal sides, said U-section member also having an outer surface disposed in a generally vertical plane to facilitate attachment of an outer wall sheath;
a pair of aligned, wall pillar members fitted about the U-shaped member with one abutting each of the sides of the longitudinal member and being welded thereto and said pillar members having an outside, flat section in alignment with and in a vertical plane with the outer surface of the longitudinal U-section member thereby providing a smooth, continuous surface for attachment of an outer wall sheath to said railway car;
a reinforcing member having means located at the juncture of the wall pillar members and the longitudinal U-section member therein and having weld means to interconnect the reinforcing member and the sides of the longitudinal member forming means in alignment with the vertical pillar members to thereby provide a continuous, structural wall pillar member extending through the longitudinal member for improved rigidity and dimensional stability.

2. A frame as recited in claim 1 wherein the reinforcing member includes a U-shaped member with means inserted between and including means welded to the horizontal sides of the longitudinal member after the wall pillar members have been welded to the sides of the longitudinal member to prevent relative movement of said horizontal sides.

3. A frame as recited in claim 1 wherein the reinforcing member is a flat plate disposed in a vertical plane and having means welded across the distal edges of the sides of the longitudinal member to thereby structurally interconnect said sides for dimensional stability and strength.

4. A frame as recited in claim 1 wherein the reinforcing member is a U-shaped insert having a base and parallel arms extending therefrom in a vertical plane and being located between the sides of the longitudinal member with said parallel arms extending into and toward the base of the longitudinal member.

5. A frame as recited in claim 4 and first weld means joining the arms of the insert to the sides of the longitudinal member, and, second weld means joining the base of the insert to the distal edges of the sides of the longitudinal member to thereby provide an improved joint between said longitudinal member and the aligned wall pillar members and reduce dimensional distortion and instability after welding.

6. A frame as recited in claim 1 wherein each of the wall pillar members has a U-shaped cross section including a pair of parallel sides interconnected by a base and third weld means joining the wall pillar members to the longitudinal member and said parallel sides and base have means extending to a corresponding plane with the distal portions of the longitudinal member to provide continuous, smooth surfaces on the interior and exterior of said frame for attachment of other railway car wall components.

7. A frame as recited in claim 6 wherein the distal edge of the parallel sides of each wall post member has an external flange.

8. A frame as recited in claim 7 and further comprising oppositely extending flanges on said longitudinal members and said wall pillars having an offset formed to accommodate the flanges of the longitudinal member to provide a flush, continuous, smooth joint.

9. A method of constructing a low distortion welded structural frame for a railway car wall comprising:
 a first step of welding a pair of aligned wall pillar members to opposite sides of a U-shaped longitudinal member having a pair of horizontal sides interconnected by a base and aligning the outer portions of the wall pillar members and the longitudinal member in a common plane to facilitate attachment of an outer wall sheath for said railway car;
 a second step of positioning a reinforcing member between the sides of the longitudinal member in alignment with the wall pillar members; and
 a third step of welding the reinforcing member to the sides of the longitudinal member in position to provide a continuous framing member extending across said railway car.

10. A method as recited in claim 9 wherein the reinforcing member is a U-shaped insert having a base with parallel arms extending therefrom and including the additional steps of:
 positioning the insert so that the arms thereof extend into the U-shaped portion of the longitudinal member between the sides and toward the base of the longitudinal member, and wherein the insert is welded in position by:
 welding the arms of the insert to the sides of the longitudinal member; and
 then welding the base of the insert to the distal portion of the sides of the longitudinal member.

11. A method as recited in claim 9 and including the steps of:
 providing the longitudinal member with upper and lower flanges;
 forming an offset portion into the wall pillar members;
 nesting the wall post members into position with the offset fitted about the associated flange of the longitudinal member;
 inserting the reinforcing member into the open portion of the longitudinal member; and
 welding the base of the reinforcing member to the adjacent flange.

* * * * *